INVENTORS.
MARK M. SIERA
RICHARD G. DAVIS
BY George Sullivan
Agent

INVENTORS.
MARK M. SIERA
RICHARD G. DAVIS
BY George Sullivan
Agent

FIG. 9
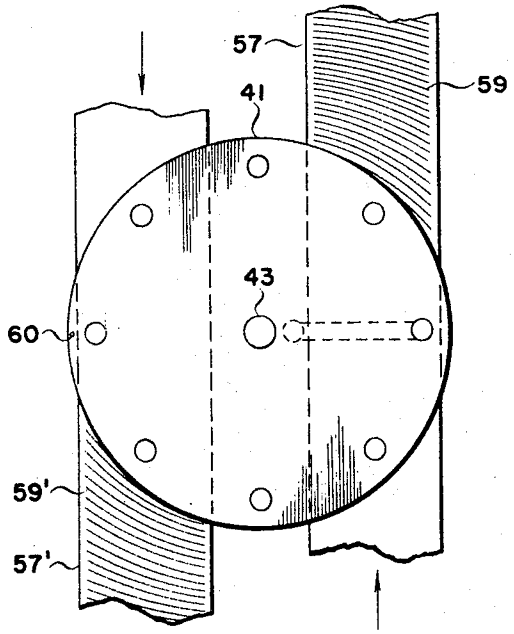
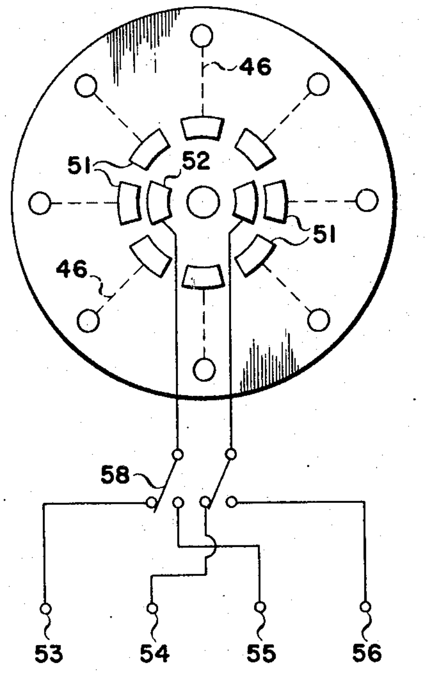
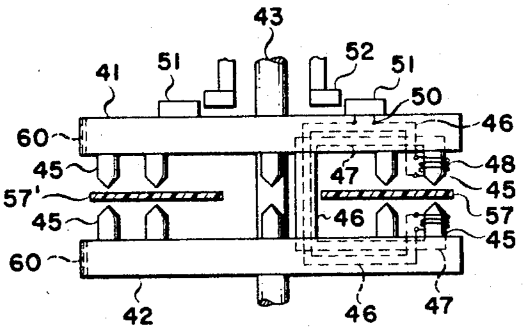
FIG. 10 FIG. 11
FIG. 12
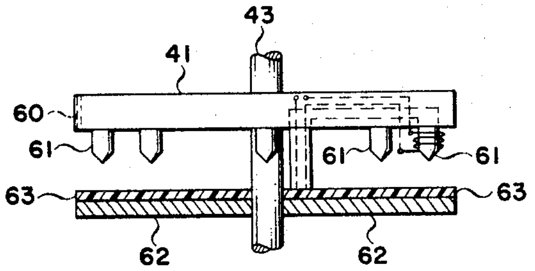
INVENTORS.
MARK M. SIERA
RICHARD G. DAVIS
BY George C. Sullivan
Agent 3,454,727

PLURAL TRACK FLUX GATE TRANSDUCER HEAD WITH COMMON EXCITATION MEANS

Mark M. Siera, Los Altos, and Richard G. Davis, Saratoga, Calif., assignors to Lockheed Aircraft Corporation, Burbank, Calif.

Filed Dec. 6, 1965, Ser. No. 511,713
Int. Cl. G11b 5/02, 5/12
U.S. Cl. 179—100.2 1 Claim

ABSTRACT OF THE DISCLOSURE

Apparatus for recording and reproducing electrical signals from a magnetic recording medium, in which the information is perpendicularly recorded utilizing a recording lead with a plurality of pointed tip poles. The recording medium passes between the poles and the magnetic flux from the poles is confined to a very small area perpendicular the recording medium for high recording density.

The present invention relates in general to magnetic recording and reproduction and in particular to an apparatus for increasing the storage density and bandwidth of magnetic recorders.

In conventional magnetic recording techniques, electromagnetic transducers (heads) are used to record and reproduce magnetically stored information on various media responsive to magnetic energy. These heads consist of semicircular cores made of materials with high magnetic permeabilities onto which coils are wound, so that a magnetic field can be produced in the record mode or sensed in the reproduce mode. To allow the generation or reproduction of external magnetic fields, a part of the magnetic head is normally removed in order to provide a small nonmagnetic gap, in series with the lines of the magnetic flux. This gap allows part of the flux to "leak out" into the magnetizable medium, thus magnetizing its particles proportional to the information current applied to the coil. A reciprocal process as just described for the record or write mode occurs in the reproduce or readout mode.

Either the head or the magnetic medium or both have to be moved relative to each other in order to make room for subsequent information in the record mode and to provide flux change necessary to induce from media to head in the reproduce mode. Such relative head to media motion is normally produced by a constant velocity V which causes the formation of a finite wave length $\lambda$ for each discrete frequency F of the information bandwidth to be recorded. The recorded wavelength $\lambda = V/F$ decreases with increased frequency F and increases with increased velocity V, and neither very short wavelengths nor very high velocities are practical with the previous state of the art devices.

If sinusoidal information of the wavelength $\lambda$ was to be reproduced by a head whose gap length (dimension in the direction of motion) was equal to that wavelength, all the positive and negative values of the sine wave would appear simultaneously in front of the gap and cancel each other, so that the voltage at the head coil terminals would be equal to zero. It is obvious that the reproduce head gap must be shorter than the shortest recorded wavelength and should be preferably equal to one-half of the shortest wavelength produced by the highest frequency to be reproduced. This fact limits present methods severely, since it is impossible to reduce the gap length indefinitely because of mechanical and electrical limits which revert a reproduce head with extremely short gap to a closed toroid which cannot resolve external magnetic fields.

To overcome the limitations imposed by the extremely high velocities of media which were required to reproduce high frequencies, rotating heads are used in present methods instead of stationary heads, while the movement of the media is necessary only to scan subsequent information. In such systems, one or more magnetic heads are mounted on the periphery of a head wheel or head drum and the head gaps, contained in the extreme head tips, extends slightly in radial direction beyond the periphery of the wheel or drum. The medium, for example, magnetic tape, is curved across its width to follow the arc of a sector of the head wheel or a helix around the head drum and moves parallel to a shaft which rotates the wheel or drum at a constant velocity V when driven by a suitable motor. With a wheel or drum diameter D, a frequency F will produce a finite wavelength $$\lambda = V \times \pi D/F$$

which again cannot be decreased indefinitely nor can the diameter D or velocity V be increased without limitation, whenever the storage or reproduction of higher frequencies is required.

A limiting factor is the separation loss which is incurred whenever there was a separation S between the head and the medium. The separation loss equal to $55 \times S/\lambda$ db becomes substantial when the shortest wavelength is decreased as a function of increased frequencies to be recorded and reproduced. Previous methods have used pressure devices in order to avoid such losses by forcing the medium against the head and thus increasing the intimate contact to an optimum. Typical for rotating magnetic heads are pressure shoes which deform the originally flat configuration of the medium into an arc which momentarily conforms to the periphery of the rotating head wheel or drum while the tip of the head scans the width of the medium at a high rate of rotation. Limited control of head to media separation can be achieved by these means when wavelengths above 0.00025 inch are used and losses of approximately 10 db can be tolerated. At these limitations extreme friction and wear are normally experienced, so that the operational life of heads and media are very short and the increase of head wheel or drum diameters or rotational velocity, for recording and reproduction of higher frequencies, appears impossible since this would further increase the relative wear and decrease the operation life span of the components.

In order to overcome the limitations inherent in systems for recording and reproducing using "flux leakage" types of magnetic heads, the present invention makes use of perpendicular recording techniques. While in conventional recording techniques the leakage flux emanating from the nonmagnetic gap of a record head is used to magnetize the particles of a medium and the main flux existing between the poles of the head core is lost, the contrary takes place in perpendicular recording. In perpendicular recording techniques the magnetizable particles of media, like tape or disc, are exposed to the main flux of a magnetic head. If the head is shaped to accommodate the medium between the two opposing poles of an electromagnet the particles are magnetized by the data current applied to the record coils in a direction perpendicular to the longitudinal and lateral extensions of the medium. The vertical pole pieces can be pointed in order to avoid losses and spreading caused by leakage flux, which could become substantial if the tips of these pole pieces were left flat or even rounded. The pointed tips increase the efficiency of the pole pieces and the definition of the magnetic record, so that the areas of magnetization on magnetic media can be confined to dimensions which do not exceed those of the pole tips. By using the perpendicular recording technique, the control of the dimensions and the resultant lateral storage density become a problem of microminiaturization. For example, in one embodiment of the present invention it is possible to subdivide high frequency serial data into a great number of parallel channels or to gather information from a number of sources and thereafter record them onto multiple parallel tracks of a recorder. This information can be reliably read out and subsequently recombined into its original format. Since the read/write heads are sensitive to the magnitude of the stored flux itself, and not the rate of change of flux as in conventional recording, the storage medium does not have to be moved in order to produce a readout.

In another embodiment of the present invention utilizing perpendicular recording techniques, a rotating head consisting of an upper and lower head wheel or disc is rotated by a common shaft. For example, eight magnetic record/reproduce transducer heads are mounted at 45° angle points of the head wheel periphery. Each head consists of two pointed pole pieces which protrude from the upper and lower head wheel with their points facing each other. These pole pieces carry the record/reproduce coils and are magnetically connected by two horizontal and one vertical head link. The coils are connected to the rotating components of a reliable commutating device which is capable of conducting the data to and from the heads. Track coincidence is controlled by a longitudinal control track on each tape which actuates tape speed control servos in the conventional manner. Since the heads can be spaced from the tape in the perpendicular record/reproduce method, no friction is created and no head or tape fouling can occur. As a result of this, head and tape life are increased as well as reliability. Power requirements, weight and volume (less tape/smaller motors) are considerably decreased.

The main object of the present invention is to provide an improved magnetic recording and reproducing device having the capability of increasing storage density and/or bandwidth for recording and reproducing information.

One feature of the present invention is to provide an improved electromagnetic transducer head which greatly increases the storage density possible to be recorded.

Another object of the present invention is to provide an electromagnetic transducer head which is capable of recording higher frequencies than have ever been possible to store on magnetic tape.

Another feature of the present invention is the use of perpendicular electromagnetic transducer heads which greatly reduce the frictional wear on the tape and magnetic heads.

Another feature of the present invention is the use of a pointed perpendicular recording pole piece which utilizes a greater percentage of the magnetic flux than ever before possible.

Another feature of the present invention is to provide a means for recording and reproduction onto and from more than one magnetic medium simultaneously or independently without the need for more transducer heads than are required for one medium alone.

These objects and features and other objects and features will become apparent to those skilled in the art of magnetic recording and reproduction after a perusal of the following specification and attached drawings of which:

FIGURE 9 is a top view of a rotating head of perpendicular magnetic recording and reproduction.

FIGURE 10 is a plan view of a recording head shown in FIGURE 9.

FIGURE 11 is an alternative recording system using a rotating head for perpendicular magnetic recording and reproduction, and FIGURE 12 shows the commutator switching arrangement for a rotating head for perpendicular magnetic recording and reproduction.

Figures 1, 3, 4:
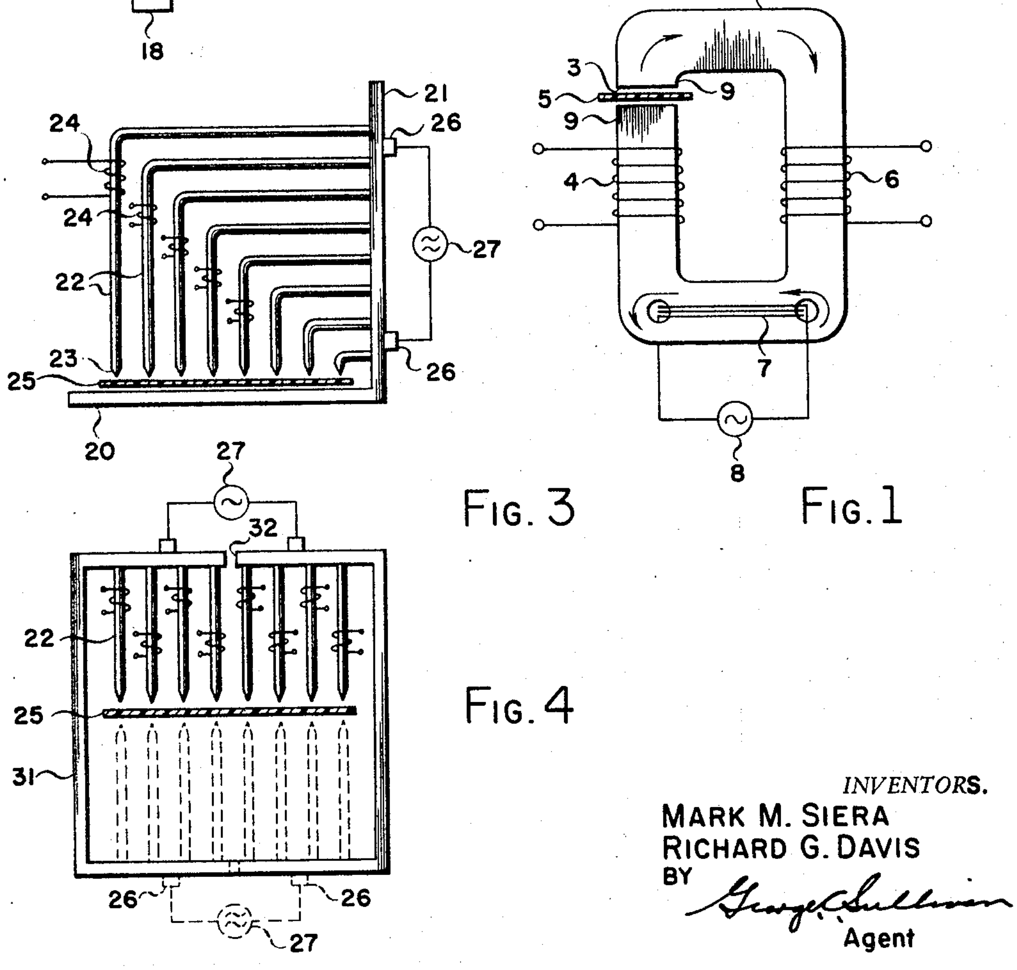
FIGURE 1 shows an electromagnetic transducer of the type used in perpendicular recording.
FIGURES 3 through 8 shows mass memory heads which may be used in conformance with the present invention.

Referring now to the drawings, the embodiment of FIGURE 1 illustrates an electromagnetic transducer used in perpendicular recording and reproducing. The transducer or head consists of a core member 1 of a material having a high magnetic permeability. A small part of the core 1 is removed in order to provide a nonmagnetic gap 3 to allow a magnetic flux to pass through the gap. An input coil 4 is wound around core 1 to produce a magnetic flux proportional to an input signal current applied to input coil 4 from an input signal source (not known. If a magnetic medium 5, for example, a tape, disc, drum, or other, can be exposed to this magnetic flux by inserting it between the poles 9 of core 1 so that its main flux penetrates and magnetizes the material most efficiently, we have accomplished perpendicular magnetic recording. While in conventional techniques the magnetic energy is converted into power by the use of motion, by using the present system it is possible to divorce motion and eventual high velocity completely from the process of magnetic recording. A signal recorded on magnetic medium 5 can be reproduced, that is, magnetic energy recorded thereon can be converted into power by alternating the magnetic flux in a configuration which is not sensitive to the rate of change of flux, but rather to the magnetic flux itself. If the core 1 is provided with an output coil 6 and an excitation coil 7 it is possible to reproduce a recorded signal from the magnetic medium 5 without the presence or need for any motion relative to the magnetic medium and the recording head. The excite coil 7 is connected to an oscillator 8 which produces a relatively high frequency signal during the readout process. This signal should be 3 to 5 times that of the highest data frequency or bit rate which is recorded on the medium that is to be reproduced. The amplitude of the excite frequency is high enough to saturate the magnetic material of core 1 at every peak of its sinusoidal wave in the positive and negative direction. This forces the gap 3 between the opposing poles 9 of core 1 to assume an almost infinitely high magnetic reluctance whenever the head is saturated. Twice every cycle of the excite frequency, however, its amplitude will go through points of 0 and the core 1 will be unsaturated and its reluctance will be very low. With the excite frequency present and in the absence of any external magnetic field, the output coil 6 will transfer the fundamental, second, fourth, etc., harmonics of the excite frequency. If, however, an external magnetic field is present in the gap 3, such as the magnetic data recorded on medium 5, this external magnetic field will modulate mainly the second harmonic of the excite frequency signal and the other even harmonics to a lesser degree. This modulation is available at the output coils 6, and, when properly filtered and demodulated in accordance with well-known practices of the recording industry, this information represents the recorded data in phase as well as in amplitude.

As can be seen, the advantages of the perpendicular recording processes just described as well as in the flux sensitive readout process, the medium 5 is always within the gap 3 between the actual pole pieces 9 of the core 1. Therefore, the medium is always within the area of the main flux. The gap 3 can be almost one order of magnitude larger than the thickness of the magnetic recording medium 5, without seriously affecting the record current requirements or the sensitivity of the core 1. Since intimate core to tape contact is not required, the danger of dropouts caused by imperfection on the tape, the core and tape wear, and the power requirements to overcome friction between normal core and tape wear are greatly reduced. Since this perpendicular recording technique is independent of motion, high frequencies can be recorded and reproduced at relatively slow speeds with constant signal levels and constant signal-to-noise ratios. A large number of parallel tracks can be recorded and, therefore, the width of the medium can be completely and more efficiently used. This reduces the length of the tape required, the power required to move the tape, and the volume required to house the tape.

Figure 2:
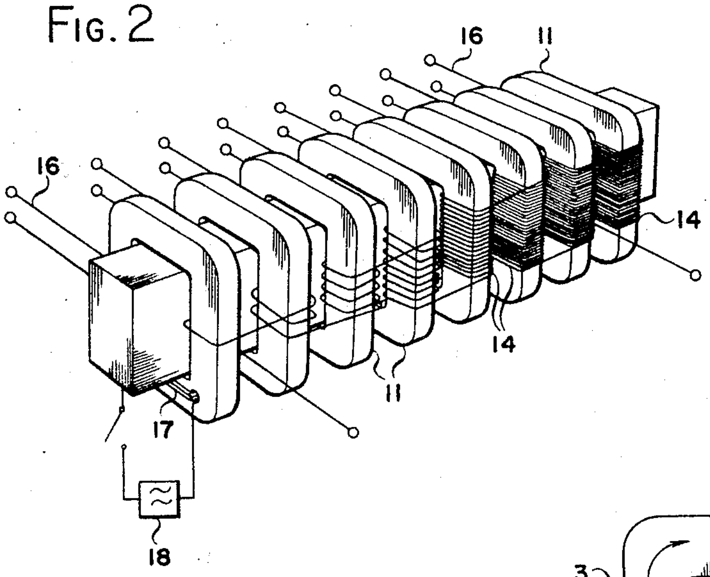
FIGURE 2 shows a system comprised of a plurality of stationary recording heads in conformance to the present invention.

One use of stationary recording utilizing perpendicular techniques is depicted in FIGURE 2. A small module composed of 8 (or more) transducers 11 similar to core 1 of FIGURE 1 are assembled in a side-by-side arrangement. Each of the transducers 11 is provided with a record winding 14 which is serially connecting one transducer to the next adjacent transducer so that a complete single current path exists from the input current winding from the extreme left transducer through each subsequent winding in serial fashion. The input windings 14 are ratioed in such a manner that each successive winding will have twice the inductance as the preceding winding. To accomplish this the first winding has, for example, but one single loop while the second has two, the third four, the fourth eight, the fifth sixteen, the sixth thirty-two, the seventh sixty-four, and the eighth one hundred twenty-eight windings. In this manner the inductances of each of the read-in coils 14 will be proportioned within each module similar to the resistance ratios and comparators for analog-to-digital converters; that is, L, 2L, 4L, 8L, etc. All of these coils 14 will be series connected within the analog module, so that the total impedance of the read-in circuit will be high enough to be directly connected to even very low level, low impedance data sensors. A low current from the sensor will saturate only the magnetic medium at the high inductance transducers while much higher currents will saturate the medium at the transducers of the lower inductance. This provides a non-destruct analog memory with added adaptive data compression, since subsequent currents of equal magnitude will not change the previous state of magnetization. A plurality of output or reproduce windings 16 are also wound around each transducer 11 but each output winding 16 is independent of the adjacent output winding. An excitation coil 17 is also provided for each transducer 11 with an exciter-generator 18 provided to produce an excite frequency to each exciter coil 17 in a parallel manner so that an excite voltage is present at each transducer head 11.

In instances where it is desirable to record extremely high density of information on magnetic media such as magnetic tape it may be advantageous to utilize mass memory heads such as those depicted in FIGURES 3 through 8. It is important to realize that the magnetic heads being described are stationary and the magnetic medium may be either stationary or movable, depending upon the desires of the use. Each of the mass memory heads utilizes perpendicular recording and flux responsive readout with microminiaturized processes of modern magnetic materials which results in high storage densities and will provide high access.

Referring to the mass memory head depicted in FIGURE 3, a plurality of vertical pole pieces 22 are connected to a vertical carrying member 21 via horizontal extension arms 22'. Vertical carrying member 21 is connected to a base pole 20 which forms the magnetic return pole common to all eight pole pieces 22. Base pole 20, carrying arm 21 and pole pieces 22 are all made of a material capable of carrying a magnetic current. Each of the pole pieces 22 are provided with a record/reproduce coil 24 provided to carry a record signal into and a reproduce signal from its respective pole piece. Each of the pole pieces 22 is terminated with a pointed tip 23. The pointed tip 23 increases the efficiency of the pole pieces and the definition of the magnetic record, so that the areas of magnetization on a magnetic medium 25 can be confined to dimensions which do not exceed those of the pole tips. A sufficient air gap is retained between tips 23 and base pole 20 to pass the magnetic medium 25 therethrough. An excitation generator 27 capable of producing a high frequency signal is connected to the mass recording head via input terminals 26. It is important that the excitation frequency signal be connected to the mass memory heads in such a position as to insure that the excitation signal is applied in a nonsymmetrical position. The nonsymmetrical application of the excitation signal avoids or reduces the presence of the excite voltage within the gap between the tips 23 and the base pole 20.

Figures 5, 6, 7, 8:
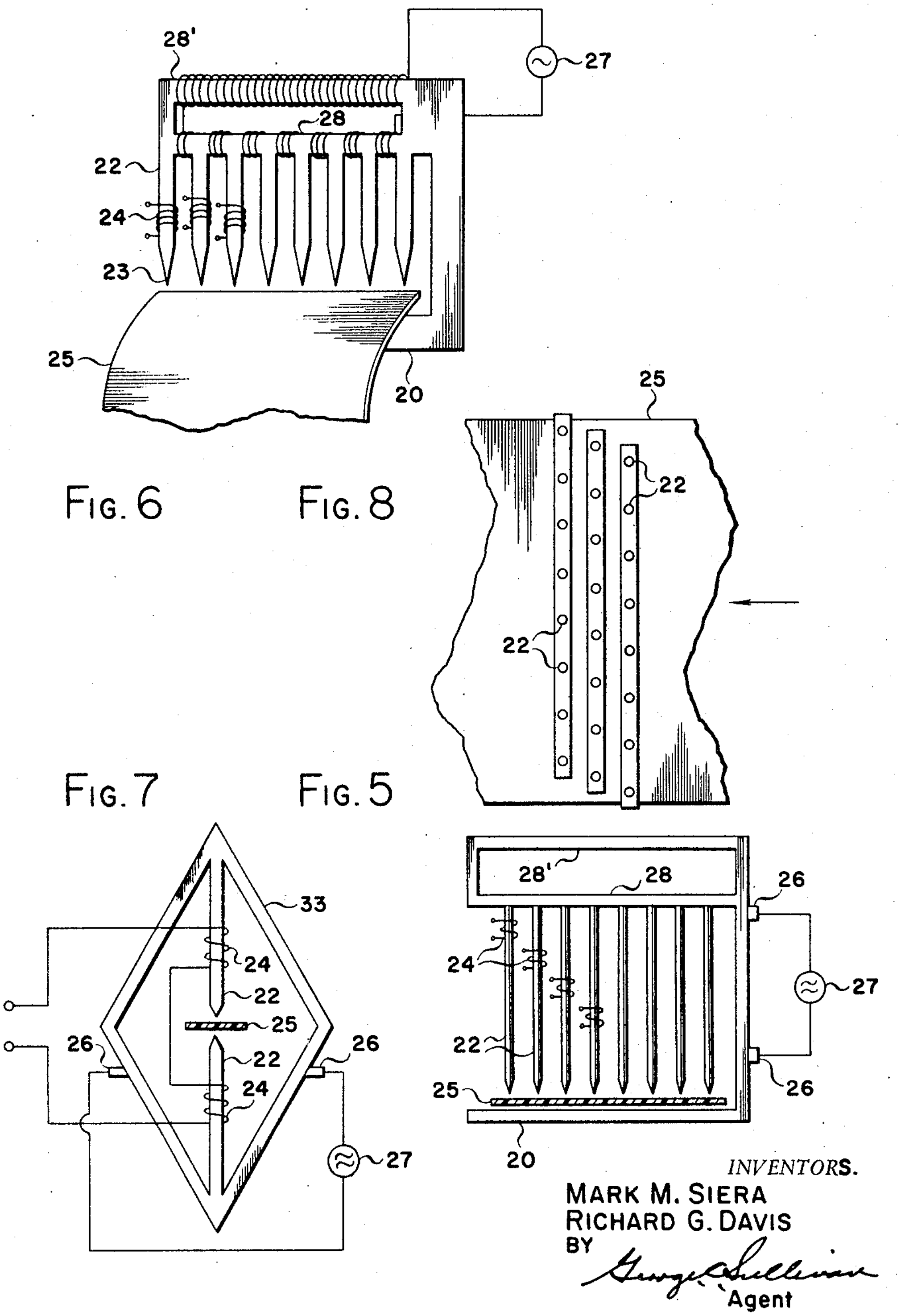

FIGURES 5 and 6 depict alternate embodiments of mass memory heads similar to the mass memory head of FIGURE 3. For example, mass memory heads shown in FIGURES 5 and 6 have a horizontal carrying arm 28 from which the pole pieces 22 are extended downward. A parallel horizontal arm 28' is attached to horizontal carrying arm 28 and separated therefrom. If desired, it is possible to connect the excitation current to the mass memory heads of FIGURES 5 and 6 by the parallel horizontal arm 28' as shown in FIGURE 6. The horizontal arms 28 and 28' are connected to a base pole 20 via a vertical carrying member 21 and in all other respects, the embodiments of FIGURES 5 and 6 are similar to that described in FIGURE 3.

FIGURES 7 and 4 show still other embodiments of perpendicular recording utilizing stationary heads. FIGURE 4 shows a substantially square common pole piece 31 having a plurality of pole pieces 22 extended inwardly therefrom from one side of the common pole piece. An excitation frequency signal is provided by a high frequency generator 27 shown connected to the common pole piece 31. To insure that the excitation frequency signal will appear in a great part of the common pole pieces 31 but *not* in the gap between opposing pole pieces it is important that a current discontinuity or insulating gap 32 is provided somewhere in the common pole 31. When the mass memory head of FIGURE 4 is used, a second mass memory head exactly similar thereto is positioned adjacent the first head but with its pole pieces 22 displaced in a 180° position in relation to each other so that the pole pieces 22 are pointed toward each other as shown in phantom. It is important that the opposing pole pieces be carefully aligned so that the flux lines therebetween are utilized to their best efficiency.

The mass memory head depicted in FIGURE 7 is somewhat similar to that of FIGURE 4 in that a single pole piece is provided and individual pole pairs are used to complete the magnetic circuit. Pole pieces 22 are extended inwardly from a first pair of opposing corners 29 of a diamond-shaped common pole piece 33. The excitation frequency signal is applied by an excitation generator 27 to points in a nonsymmetrical portion of common pole piece 33. Record/reproduce coils 24 are serially wound around the opposing heads 22 and an air gap between opposing tips 23 is provided for access for a magnetic medium 25 to pass through. If it is desirable to obtain a maximum amount of storage density on a single width of tape it may be necessary to arrange a plurality of mass memory heads in an offset manner such as shown in FIGURE 8. Here the mass memory pieces are stacked adjacent each other such that the pole pieces 22 are offset from each other by a distance of at least one-half the head diameter. This arrangement pemits parallel tracks of recorded information to be deposited on the magnetic medium 25 as close as possible still maintaining enough space to prevent cross-talk therebetween. By this technique and with the use of pole tips having dimensions of less than 1,000th of one inch we have recorded approximately 500 parallel tracks of recorded information across a tape width of approximately one inch. This technique has resulted in great improvements over conventional parallel storage densities. By using the increasing know-how in the techniques of microminiaturization this is by no means the ultimate storage density limit. During operation of the recording or reproduce modes utilizing mass memory heads such as depicted in FIGURES 3 through 8 the magnetic medium may be either stationary or moved slowly between the air gap in relation to the magnetic heads. The embodiments described above are best suited for recording parallel bits of information with the recording medium being either moving or stationary. Those skilled in the art of recording could easily adapt these mass memory heads to fit their exact needs or desires without departing from the spirit of the invention contained therein. It is noted that no drive means for moving the magnetic medium is shown. However, state of the art tape drive mechanisms which are currently available are adequate to do the job.

In certain instances it is highly desirable to utilize magnetic perpendicular recording techniques but when the bandwidth of frequencies to be recorded serially is extremely high it is necessary to employ a rotating head. The perpendicular recording techniques set forth in FIGURES 9, 10 and 11 are capable to recording information at frequencies in excess of 100 megacycles. These embodiments employ perpendicular recording techniques as described above, however, no excite signal is needed since the recorded data is reproduced by moving the recording head in relation to the storage medium.

FIGURES 9, 10 and 11 show in schematic an embodiment incorporating the features of the present invention utilizing movable magnetic transducers. A pair of circular transducer-carrying-discs 41 and 42 are carried by a shaft 43 and are capable of being driven in either direction by a driving force, for example, an electric motor (not shown). A plurality of magnetic transducer head pairs 45 are shown extending toward one another from each head wheel 41 and 42. Magnetic transducer head pairs 45 are separated from each other by an equal arc length of circle around the center line of shaft 43. It is important that each opposing top and bottom transducer head tip of the transducer head pairs be accurately aligned with respect to one another to make sure that the greatest possible magnetic flux strength will pass through the air gap defined by the opposing transducer head pair tips. As best seen in FIGURE 10 a perpendicular carrying arm 46 and a horizontal carrying arm 47 each capable of passing magnetic current therethrough connect the top and bottom members of transducer head pairs 45 to complete a magnetic flux path from pole tip to pole tip. A suitable record/reproduce coil 48 is wound around each of the opposing transducer head pairs 45 in a serial manner to supply input magnetic current or to take away the reproduce current from the transducer head pairs. As well understood in the art, the transducer heads and horizontal and perpendicular linkages are of a material having a high magnetic permeability or molded particles with high magnetic permeability, or a combination of both, depending on the frequency range and bandwidth at which the heads are required to record and reproduce. The extreme tips of the transducer heads 45 are pointed to provide as narrow a flux path as possible. A pair of magnetizable media 57 and 57′ may be passed through the air gap defined by opposing transducer heads.

In order to record and retrieve a signal to and from the transducer head pairs a commutator system such as shown in schematic form in FIGURE 11 may be utilized. A plurality of commutator segment pieces 51, one for each magnetic transducer head pair 45, is provided around the top of disc 41. Commutator segments 51 are secured to disc 41 in such a manner that whenever the shaft 43 is rotating, turning discs 41 and 42, the commutator segments will move as an integral part thereof. An electrical disconnect 50 is provided between coils 45 and the respective commutator segments 51 by input and output terminals 49. A pair of commutator brush members 52 are mounted with respect to segments 51 such that they will be stationary when the disc 41 and commutator segments 51 are rotating. In this manner, the commutator segments 51 rotate around the stationary brushes 52 and are in sequence electrically contacting brushes 52 at the rate of rotation. The electrical signals applied to the brushes 52 are sequentially distributed through the segments 51 which are electrically connected to the coils 48 of the transducer head pairs 45. An electrical signal input of suitable frequency and input can be applied to either both or one of the input terminals 53 and 54 of the commutator. If desired, it is possible to record two separate signals simultaneously by feeding separate input signals into inputs 53 and 54, through brushes 52 and the particular commutator segment 51 which is in intimate contact therewith and its respective transducer head pair 45, one on each side of the disc 41. By passing a tape 57 and 57″ between the transducer head pairs and rotating the head pairs in the correct synchronism with respect to the movement of the magnetic medium, high speed recording is achieved. When it is desired to reproduce the data on the tape, the output terminals 55 and 56 are connected to the stationary brushes 52 by switching switch 58 to connect to the output terminals with the stationary brushes. It is believed that the commutator arrangement of FIGURE 11 is well within the skill of any electrical designer to produce and no patentable invention resides therein. Further, it is believed that a rotary transformer could be substituted for the commutator arrangement as shown and that also is believed to be well within the skill of any electrical designer.

If the discs 41 and 42 are rotated at a constant velocity V, while one or more of the recording tapes 57 or 57′ is moved at a suitable constant speed S, while the points of the transducer head pieces 45 are arranged concentrically around the periphery of the disc having a diameter D, then curved lines or tracks 59 and 59′ are deposited in magnetic form onto the tape 57 and 57′, respectively, during the record process and scanned and recovered during the reproduce process. If an electric current of the frequency F is applied to the coil terminals, with an amplitude high enough to magnetize the particles of the tape 57 and 57′ which at that point happen in time to be between the pole tips of the transducer head pieces 45 to whose coil the current is applied, a perpendicular magnetic dipole is recorded whose cross-sectional area is proportional to that of the pole tip points and whose length is equal to the thickness of the magnetic medium. If the perpendicular dipoles with a diameter $d$ are recorded with the frequency F applied to the input of such a rotating head system this frequency is proportional to the head velocity V, the circumference of the head perimeter $\pi$D, and inversely proportional to the dipole diameter $d$. That is $F=V\pi D/d$.

With the present invention the frequency F can be increased by increasing the velocity V or the diameter D of both without incurring friction, wear, or other detrimental or life-reducing results. We have shown a system carrying 8 transducer heads carried by the rotating disc but this number is not fixed but dependent upon the ratio of the head perimeter circumference $\pi$D to the width of the medium W. In other words, the number of heads required $N=\pi D/W$ in order to allow one pass across the medium to follow another pass. As each pass forms a track whose width W should be at least 1½ times the diameter $d$ of the recorded dipoles, in order to avoid cross-talk between adjacent tracks, this is achieved by advancing the medium with a constant longitudinal speed $s$ by$1.5d$ during the time T of each single head pass. Since $T=W/\pi DV$, $s=1.5d/T=1.5d\pi DV/W$ which shows shows that the longitudinal speed of the medium can be decreased by increasing the width W of the medium or by reducing the diameter $d$ of the recorded dipoles.

In order to control the motion of the tape in relation to the rotating head motion and for synchronization between record and reproduce modes, conventional means such as control tracks, recorded by stationary record and reproduce heads, are applied and optical indicators are used. For example, small holes 60 in the periphery of the disc 41 and 42 may be used to allow light from a source close to hole 60 to shine therethrough onto a photosensitive element which is mounted on the opposite side of disc 41 from the light source. In this manner each head revolution can be counted and the location of the heads relative to the track can be controlled. A head and tape speed control system such as this is well within the skill of the art of any person knowledgeable of magnetic recording.

An alternative embodiment from that described above is presented in FIGURE 12. The upper disc 41 is identical with upper disc 41 of FIGURE 10. A circular transducer carrying disc 41 is carried by shaft 43 and is capable of being driven in either direction by a driving force, for example, an electric motor (not shown). A plurality of magnetic transducer heads 61 are shown extending downward from disc 41. Magnetic transducer heads 61 are separated from each other by an equal arc length of circle around the center line of shaft 43. A lower disc 62 is positioned on shaft 43 and spaced a short distance below the bottom of the transducer head tip 61. Attached to the upper portion of disc 62 is a plate of magnetic material 63 having a magnetic permeability higher than that of magnetic recording medium 57 and 57′ which is shown in the arm gap between magnetic transducer heads 61 and the upper surface of magnetic member 63. Magnetic plate 63 replaces the lower portion of the magnetic transducer heads 45 of FIGURE 10.

The transducer heads 61 are provided with coils 48 which are connected to a commutator system similar to that shown in FIGURE 11. A magnetic interconnect 46 is provided as a flux current path means between the transducer head 61 and the magnetic plate 63. The magnetic medium, for example, tapes 57 and 57′, move freely between the rotating heads 61 and the upper surface of magnetic plate 63 so that the perpendicular dipoles are recorded and reproduced whenever suitable electronic currents are connected to the coils 48 of heads 61.

What has been shown is a novel means for magnetic recording and reproduction utilizing perpendicular recording techniques. The invention provides a method and means of increasing storage density and/or bandwidth for recording and reproducing information, while reducing wear and other detrimental parameters, thereby increasing the operational life of the active components. The practical means of realization of the present invention is based on the utilization of magnetic processes of recording and reproduction onto magnetizable media such as film, tape, wire, disc, and others. It is evident, however, that such magnetic systems may be replaced by another method or discipline of recording and reproduction, as for example, by photographic processes using photosensitive media, without departing from the spirit of the invention set forth herein.

We claim:

1. In an apparatus for recording and reproducing electrical signals onto and from a magnetic recording medium:

a magnetic recording and reproducing head including an air gap defined by a plurality of spaced parallel pole pieces, and at least one opposing pole piece;

magnetic means connecting said pole pieces;

a plurality of said pole pieces each having a sharply pointed extreme tip for confining magnetic flux in said air gap into a plurality of flux paths, each as narrow as possible;

means for placing a magnetic recording medium within said air gap substantially perpendicular to said flux paths;

a plurality of electrical signal coil means each individually magnetically coupled to one of a plurality of said pole pieces having pointed extreme tips, each signal coil means providing an independent electrical output signal in response to the magnetic flux state of a small area of said magnetic recording medium in said air gap adjacent said one pole piece;

secondary magnetic coupling means for applying a magnetic excitation signal to said head in response to an applied electrical excitation signal;

and oscillator means connected to said secondary magnetic coupling means applying thereto an oscillating cycle high frequency electrical excitation signal during the reproduction of said magnetic flux state of said recording medium in said air gap, said excitation signal having a frequency higher than that of the highest frequency of the recorded information on said recording medium and having a maximum amplitude sufficient to magnetically saturate said head during only a portion of each cycle of oscillation of said excitation signal;

said output signals of each of said electrical signal coil means being harmonics of said high frequency excitation signal controlled in amplitude by the magnitude of the stored magnetic flux of said small area of said recording medium in said air gap adjacent said one pole piece, independent of the movement of said recording medium and the rate of change of flux thereby.

References Cited

UNITED STATES PATENTS

| | | | |
|---|---|---|---|
| 2,416,090 | 2/1947 | De Forest | 73—88.5 |
| 2,785,038 | 3/1957 | Ferber | 346—74 |
| 3,017,617 | 1/1962 | Quade | 340—174.1 |

BERNARD KONICK, *Primary Examiner.*

R. S. TUPPER, *Assistant Examiner.*